(12) United States Patent
Plocher et al.

(10) Patent No.: US 7,954,070 B2
(45) Date of Patent: May 31, 2011

(54) SYSTEMS AND METHODS FOR NAVIGATING GRAPHICAL DISPLAYS OF BUILDINGS

(75) Inventors: Thomas A. Plocher, Hugo, MN (US); Jeffrey M. Rye, Roseville, MN (US); Xianghong Sun, Beijing (CN)

(73) Assignee: Honeywell International Inc., Morristown, NJ (US)

( * ) Notice: Subject to any disclaimer, the term of this patent is extended or adjusted under 35 U.S.C. 154(b) by 503 days.

(21) Appl. No.: 11/141,945

(22) Filed: Jun. 1, 2005

(65) Prior Publication Data

US 2006/0277501 A1  Dec. 7, 2006

(51) Int. Cl.
*G05B 11/01* (2006.01)
*G06F 15/177* (2006.01)
*G06F 3/048* (2006.01)

(52) U.S. Cl. .............. 715/854; 700/13; 700/15; 700/17; 715/734; 715/736; 715/764; 715/765; 715/767; 715/771; 715/853; 715/855

(58) Field of Classification Search .................. 715/853, 715/854, 855, 734, 736, 707, 765, 767, 771, 715/764; 455/404.1; 116/5; 700/15, 13, 700/17, 275, 276, 277
See application file for complete search history.

(56) References Cited

U.S. PATENT DOCUMENTS

| | | | | |
|---|---|---|---|---|
| 4,327,559 A * | 5/1982 | Spethmann | ...................... | 62/179 |
| 4,885,694 A * | 12/1989 | Pray et al. | ...................... | 705/400 |
| 5,261,044 A * | 11/1993 | Dev et al. | ...................... | 715/855 |
| 5,297,252 A * | 3/1994 | Becker | ........................... | 715/803 |
| 5,909,217 A * | 6/1999 | Bereiter | ......................... | 715/854 |
| 5,977,872 A * | 11/1999 | Guertin | ......................... | 340/515 |
| 6,003,637 A * | 12/1999 | Kim et al. | ...................... | 187/391 |
| 6,529,137 B1 * | 3/2003 | Roe | ............................. | 340/691.1 |
| 6,628,304 B2 * | 9/2003 | Mitchell et al. | ................ | 715/734 |
| 6,737,966 B1 * | 5/2004 | Calder | ............................ | 340/506 |
| 6,756,998 B1 * | 6/2004 | Bilger | ............................ | 715/764 |
| 6,829,513 B2 * | 12/2004 | Piersanti et al. | .................. | 700/83 |
| 6,907,300 B2 * | 6/2005 | O'Mahoney et al. | ............. | 700/17 |
| 6,907,575 B2 * | 6/2005 | Duarte | .......................... | 715/784 |
| 6,967,565 B2 * | 11/2005 | Lingemann | ............... | 340/310.11 |
| 6,972,676 B1 * | 12/2005 | Kimmel et al. | ................ | 340/506 |
| 7,110,919 B2 * | 9/2006 | Brindac et al. | ................ | 702/188 |
| 7,134,088 B2 * | 11/2006 | Larsen | ........................... | 715/765 |
| 2003/0011636 A1 * | 1/2003 | Feroglia et al. | ................. | 345/767 |
| 2003/0048304 A1 * | 3/2003 | Lontka et al. | .................. | 345/771 |
| 2005/0119767 A1 * | 6/2005 | Kiwimagi et al. | .............. | 700/19 |

OTHER PUBLICATIONS

Davidsson et al., "Saving Energy and Providing Value Added Services in Intelligent Buildings: A MAS Approach" from Lecture Notes in Computer Science, 2000, Springer Berlin/Heidelberg, vol. 1882/2000, pp. 166-177.*

* cited by examiner

*Primary Examiner* — Steven P Sax
*Assistant Examiner* — Grant D Johnson
(74) *Attorney, Agent, or Firm* — Husch Blackwell

(57) ABSTRACT

A display for identifying a floor of a building being monitored presents a plurality of groups of floors and a plurality of floors in a group. The groups can be of floors and selected plurality of floors automatically presented to identify one or more floors that are exhibiting a selected ambient condition being monitored. Alternately, a slide can be used to identify one of a plurality of floors. A zoom function can also be provided.

24 Claims, 18 Drawing Sheets

SYSTEMS AND METHODS FOR NAVIGATING GRAPHICAL DISPLAYS OF BUILDINGS

FIELD OF INVENTION

The invention pertains to fire and security monitoring systems of a type usable in multistory buildings. More particularly, the invention pertains to systems and methods for graphically presenting location information particularly for first responders as to fire or security incidents.

BACKGROUND

Graphical displays have been used in connection with fire, security and environmental control systems in multistory buildings to present status and location information pertaining to fires, security breaches or environmental conditions. In known displays, building objects and features can be overlaid as graphical icons on two dimensional graphical floor plans of the building. The location of objects such as various types of detectors, high value assets, hazardous materials and the like can be presented on the displays. They can also illustrate building features such as firewalls, ductwork, stand pipes, elevators, pressurized stairways, and access doors.

The process becomes more complicated when the building has multiple floors. In such instances, controls need to be provided to enable the user of the display to vertically navigate to the different floors of the building. For example, many high rise buildings have more than a hundred floors. The vertical navigation control systems need to be able to respond to such a large number of floors.

There continues to be a need for vertical navigation control systems usable with multiple floor buildings which provide intuitive and simplicity of operation. This is particularly important when events such as an alarmed detector or an activated intrusion device need to be investigated. The operator must be able to manipulate the display under conditions of extreme time pressure and stress so as to evaluate the location as well as the extent of the situation in the building to determine if an emergency is present. Preferably such navigation control systems and methods would be readily understandable and useable by operators with little or no computer skills, limited reading vision and perhaps no prior training relative to the display system.

Preferably such an improved systems and methods can be incorporated into both new and existing systems with limited manufacturing and cost impact.

DETAILED DESCRIPTION

Figure 1:
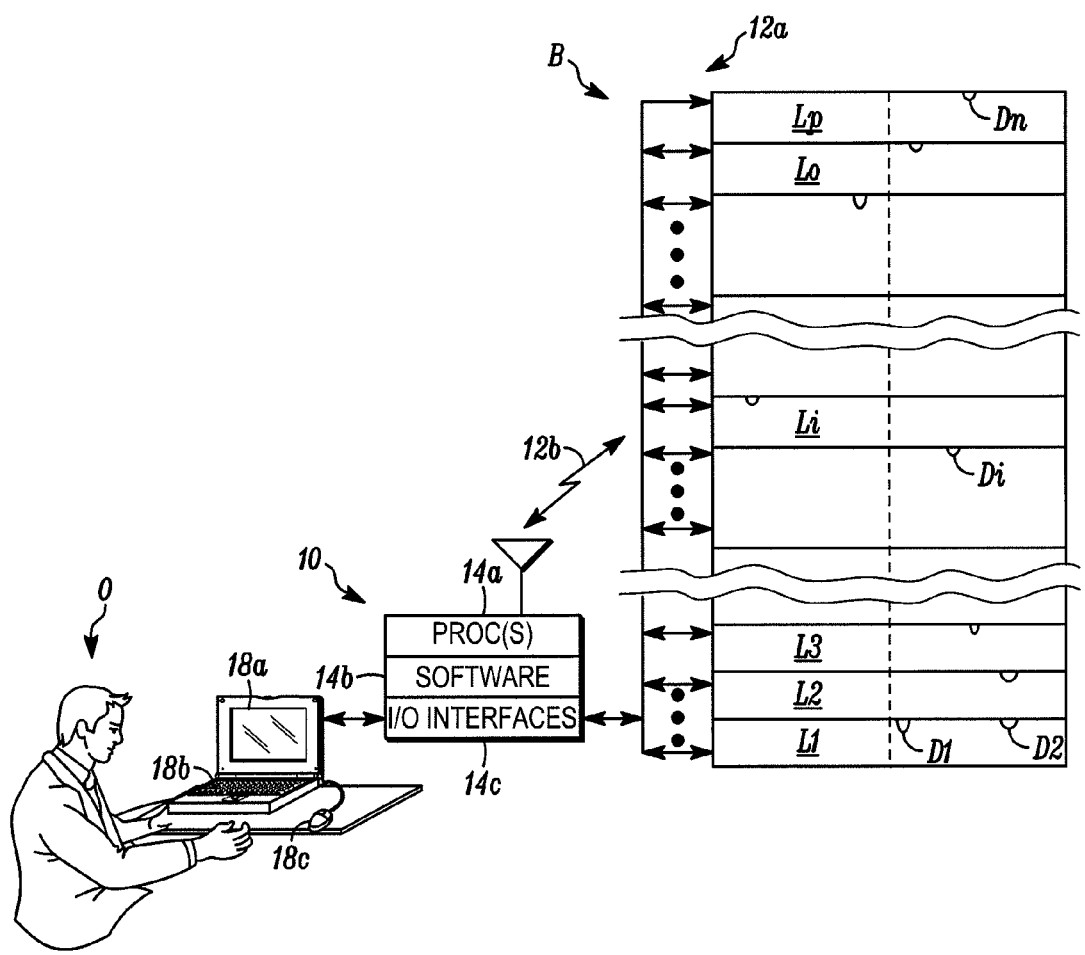
FIG. 1 is a block diagram of the system in accordance with the present invention.

While embodiments of this invention can take many different forms, specific embodiments thereof are shown in the drawings and will be described herein in detail with the understanding that the present disclosure is to be considered as an exemplification of the principles of the invention and is not intended to limit the invention to the specific embodiment illustrated.

In one aspect of the invention, first and second sets, or, "mother-daughter" sets of light buttons can be presented on a display for use by an operator. For example, "mother" buttons can be presented in the form of a vertical list in a column on the screen on either the right or the left side. Each of the "mother" buttons can designate a range of, or, a group of floors in the respective building.

"Daughter" buttons can then be presented on the display in response to a selected group or range of floors. These can represent each individual floor in the group or a range associated with the selected "mother" button.

Activating a "mother" button causes the respective "daughter" buttons to appear on the screen. Activating a particular "daughter" button then causes a respective floor plan for that floor to be selected and displayed.

A selected and displayed floor plan can illustrate in addition to the physical structure of the floor, active and inactive detectors associated with fire, security or environmental conditions. Additionally, an indicator of an active condition of interest can be associated with an activated "mother" button as well as "daughter" buttons for respective floors in the selected group or range.

It will be understood that while first and second vertical sequences of activatable light buttons were described above, in another embodiment the light button sequences can be presented horizontally for the operator. Further, the mechanism whereby the operator is able to select ranges or groups of floors, by "mother" buttons and a specific floor via "daughter" buttons can be based on a variety of technologies and is not a limitation of the present invention. In this regard, touch screens can be used. Alternately the operator could use a keyboard, mouse or track ball to select the appropriate "mother" button as well as one of the subsequently displayed "daughter" buttons. Additional levels of buttons, such as a "grand-daughter" level for example, could also be provided.

In yet another aspect of the invention, upon selection of a "mother" button, shading can be provided between the columns of buttons to link the displayed daughter buttons to the respective "mother" button. Such shading can contribute to reinforcing the operators' spatial connection between the selected group of floors and the respective individually listed floors.

In a disclosed embodiment, the various buttons can also be used to alert a user to the location of a condition in or on one or more of the floors which requires attention. For example, fire, security or environmental condition symbols can be displayed, in accordance with activated detectors, by an associated "mother button" to provide an additional indicator to the operator that an event has been detected in the respective group or range of floors.

In response to the operator activating the respective "mother" button the displayed daughter buttons can also have associated appropriate indicia indicating the detected condition or conditions. The indicia can be provided by colorizing the respective "mother" and "daughter" buttons such as providing a red button in the event of a detected fire condition. Uninvolved groups or floors can be presented in a different, unactive or neutral color.

Fire or intrusion icons can be displayed next to the appropriate button or buttons to increase the operator's awareness of the presence of a particular condition. This can be expected to shorten the operator's response time in locating the floor or floors associated with the detected condition.

In yet another aspect of the invention, control software can automatically configure an array of first-second, or, "mother-daughter" buttons in accordance with the number of floors in the building. An assessment can automatically be made as to the number of floors in the building. The existing floors can then be allocated to one or more groups or ranges depending on space available on the display to provide a plurality of first, or, mother buttons. Each of the groups will then produce a displayed list of second, or, daughter buttons, one for each respective floor.

FIG. 1 illustrates a system 10 in accordance with the invention which can be used to monitor and provide information pertaining to conditions in a building B. The building B can be for example, a multi-floor commercial or residential structure having floors L1, L2 . . . Lp without limitation. The system 10 can monitor various levels of the building B via a plurality of detectors of various known types D1, D2 . . . D-n installed throughout building which can include without limitation fire detectors, such as smoke, temperature, flame detectors, security detectors which can include position detectors, motion detectors, breakage detectors as well as environmental detectors of a type usable with a HVAC systems, all without limitation. Such detectors can be coupled via wired media indicated generally at 12a, or wirelessly at 12b with system 10. It will be understood that the nature and type of the communications and media 12a, 12b are not limitations of the present invention.

The system 10 can be implemented with one or more programmable processors 14a, control software 14b and input/output interface circuitry 14c all without limitation. The system 10 might be in close proximity to the building B or it might be a distributed system. Portions of such a system could be in close proximity to and other portions are displaced from building B. One or more portions of the system 10 can communicate with each other, for example, via a computer network such as the Internet without limitation.

The system 10 can corporate a visual display device 18a with which an operator O can interact. Display device, 18a can be, preferably, a two-dimensional display of any known type which can present information in graphical form to the operator O. The display device 18a can incorporate a touch screen for receiving feedback from the operator O. Alternately, the operator O can provide feedback via structures such as keyboard 18b, mouse or trackball 18c, all without limitation.

Figure 2:
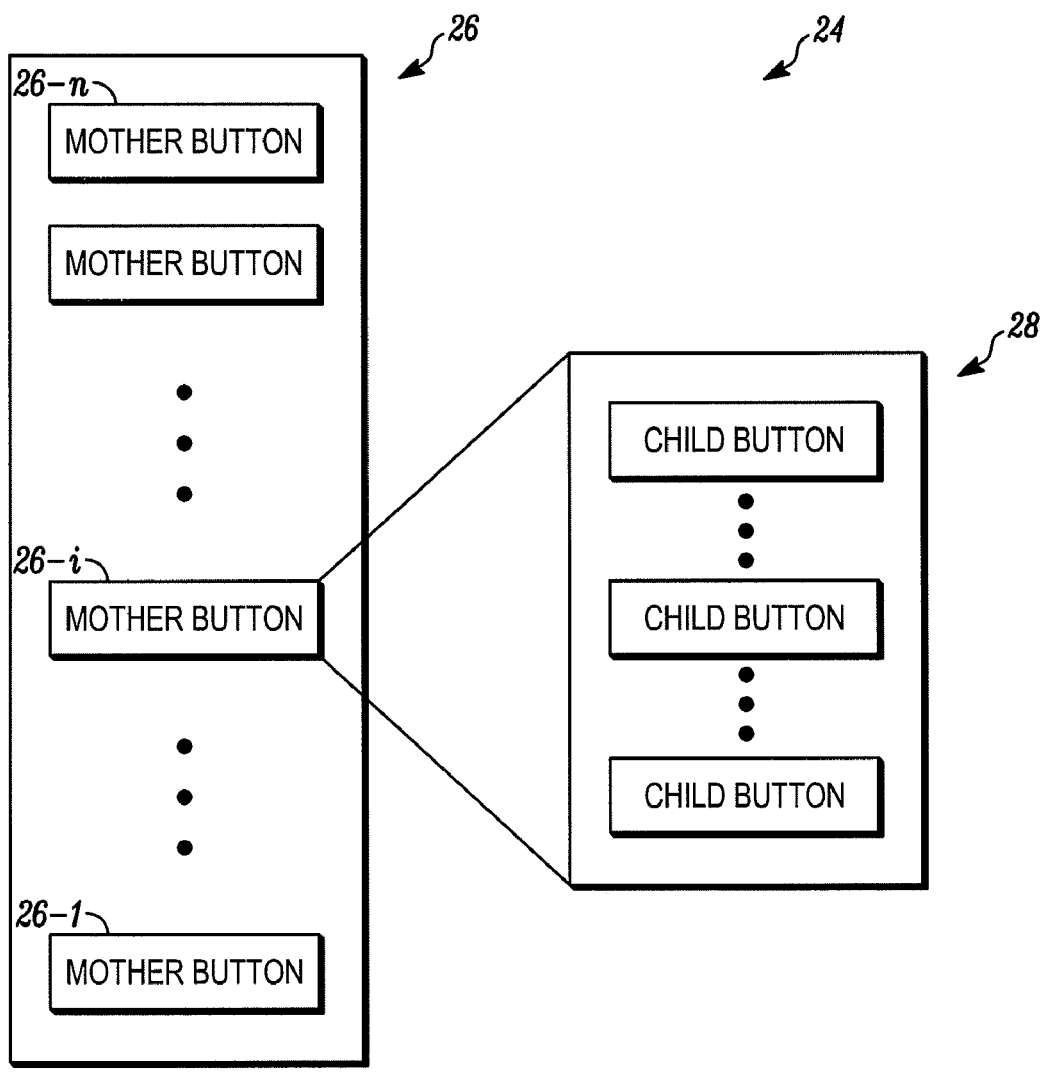
FIG. 2 is a portion of a type of display presentable by the system of FIG. 1.

It is a particularly advantageous aspect of the present invention that the system 10 can present graphical information in a form which provides for convenient and quick navigation by the operator among the levels Li of the building B on the display device 18a. For example and without limitation, FIG. 2 illustrates a multi element display 24 which can be presented on display device 18a by the system 10 to assist the operator O in navigating between floors or levels Li of the building B.

The elements 24 can include a sequence of first, or, "mother" activated light buttons or elements 26 having numbers 26-1 . . . 26-n. Each of the members 26-i represents a group or range of floors or levels Li of building B. For example, member 26-1 could represent Levels L1 . . . L5 of building B. Member 26-2 could represent levels L6 . . . L10 of building B. Member 26-n could represent the top most group of floors or levels Ln . . . Lp.

When one of the members from the plurality 26 is activated or selected either by the operator O or automatically in response to signals received from detectors in the building B, the respective member, such as member 26-i can be appropriately illuminated, and, substantially simultaneously a plurality of secondary indicia 28 can be presented. Each of the numbers of the plurality 28 corresponds to one of the floors or levels Li of the group associated with member 26-i.

The display presented to the operator O can thus automatically bring the operator's attention to one or more floors or levels in the building B, which may be in need of attention. Alternately, if the operator O is conducting routine monitoring, the structure of the display 24 makes it possible for the operator O to readily move between groups of floors for investigational purposes.

Figure 3:
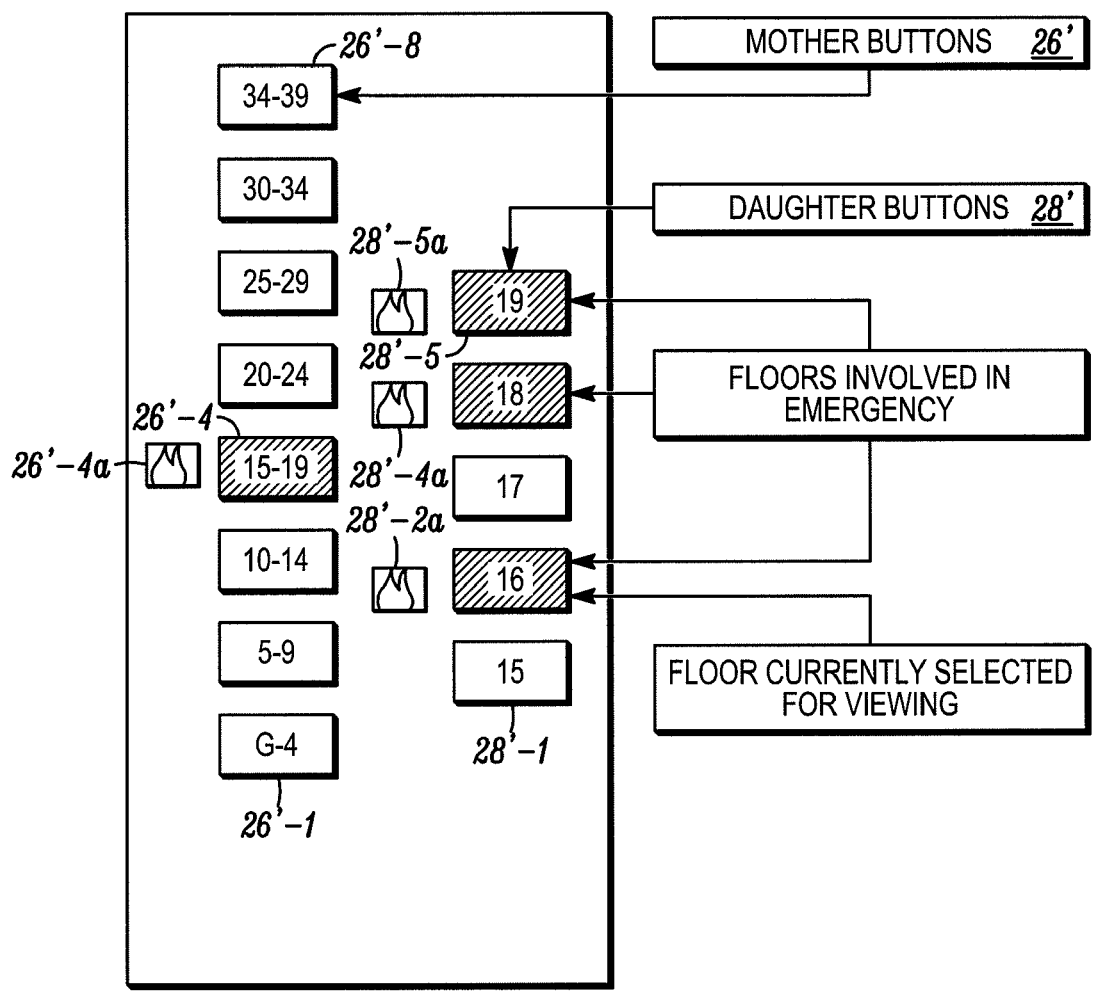
FIG. 3 illustrates additional details of the display of FIG. 2.

FIG. 3 illustrates additional operational and graphical characteristics of the navigational process and exemplary display 24. In FIG. 3 the plurality of buttons 26' extends between ground level represented by element 26'-1 and the highest level of the respective building, the 39th floor represented by element 26'-8. Each of the "mother" buttons or elements 26'-1 of FIG. 3 spans a group of five floors or levels for exemplary purposes only.

It will be understood that the numbers of elements of the plurality 26' can be increased as is desirable, and depending on space on the display 18a for a given building B. FIG. 3 also illustrates the respective floor based display of buttons 28' associated with element 26'-4, a group of floors 15-19. The "daughter" buttons or indicia 28' include one member 28'-1 . . . 28'-5 for each of the five floors or levels. In the exemplary display of FIG. 3, the group indicia 26'-4 corresponding to floors or levels 15-19 has been displayed with both an activated fire indicating color, red for example, as shown by button 26'-4 with an associated fire symbol 26'-4a.

The lighted symbol 26'-4 and associated alarm indicating icon of 26'-4a can be automatically presented on display 18a by system 10 in response to signals received from one or more floors 15-19 in the respective group. The plurality of the daughter buttons or indicia 28' can also be displayed with color and supplemental symbols indicative of a condition requiring attention.

As illustrated in FIG. 3, the buttons 28' can be presented in colorized form such as presented buttons 28'-2, -4, and -5, all without limitation. Supplemental symbols can be associated with each of the colorized indicia such as environmental symbols 28'-2a, 28'-4a, and 28'-5a. The respective floors 16, 18, and 19 are in the present exemplary instance, involved in a fire condition or emergency.

The floors can be selected for viewing, as indicated relative to floor 16, for viewing by the operator O. The display of a selected floor can present the overall shape and appearance in a top plan view and indicate not only where one or more detectors is located on the floor, but also those which may be currently active, and associated with a fire.

Figure 4:
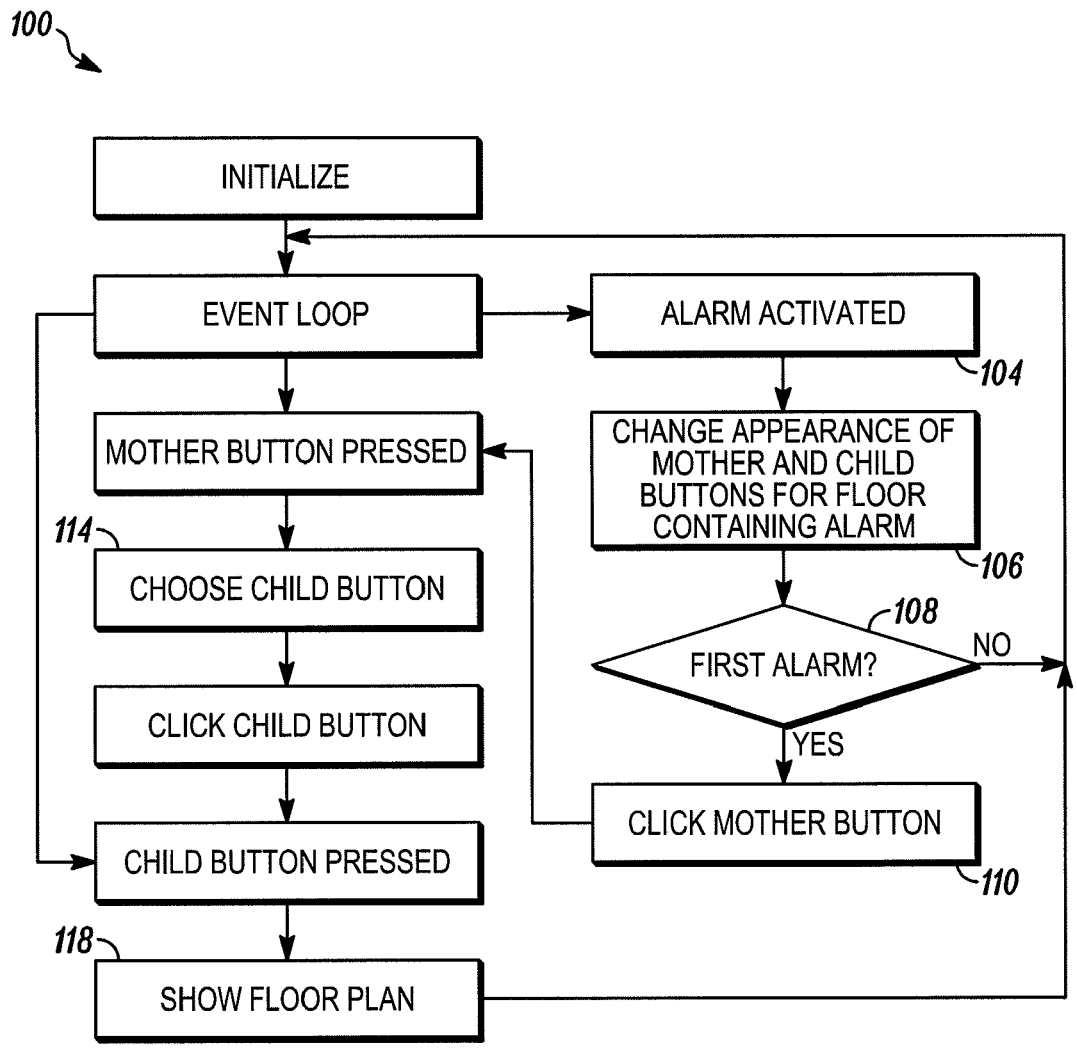
FIG. 4 illustrates a flow diagram of a method in accordance with the invention.

FIG. 4 illustrates a method 100 in accordance with the invention. An event loop can be automatically or manually entered. Where a condition requiring attention or an alarm has been activated step 104 the primary and secondary pluralities 26, 28 can be displayed, step 106 so as to illustrate (as best seen in FIG. 3) the floor or level grouping where a detected condition or alarm has originated.

If an initial or first alarm is being sent in a step 108 then the operator O has an opportunity to click on or activate a respective member 26'-i of the plurality 26' in a step 110. Once the respective member of 26'-i has been activated one of the floor or level specifying members 28'-i of the plurality 28' can be activated step 114.

Once a floor or level has been selected or determined, the floor plan can be displayed in a top plan view, by the display unit 18a in a step 118. It will be understood that the selected floor plan could not only be displayed at the display unit 18a, step 118 but could be presented at one or more displaced display units substantially simultaneously, to a plurality of different operators.

Figure 5:
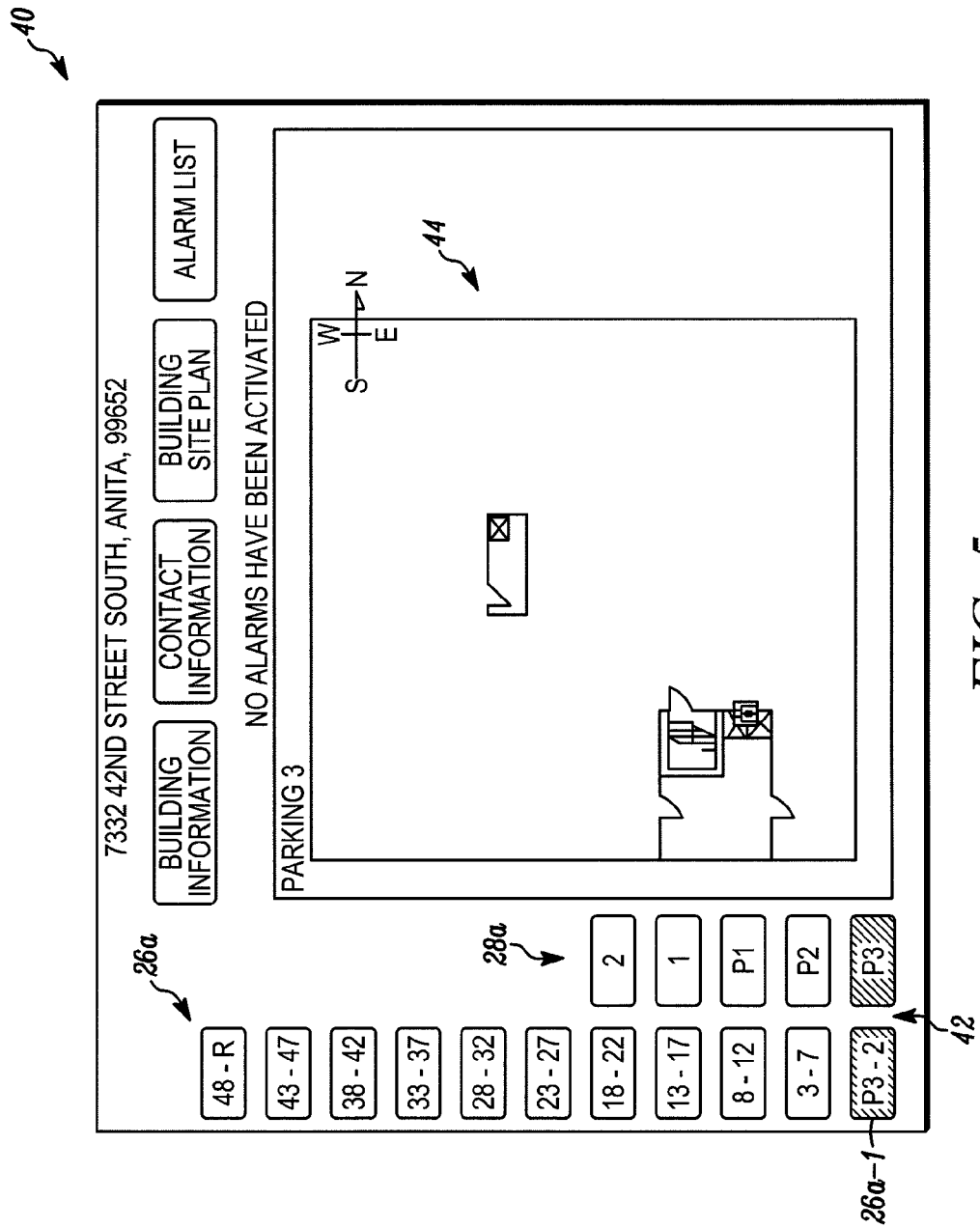
FIG. 5 is a more detailed display in accordance with the invention where no alarms have been activated.

FIG. 5 is a representative image 40 presentable on the display unit 18a where the monitoring systems associated with the building B are indicating that no alarms have been activated. The image 40 of FIG. 5 includes first and second pluralities of indicia 26a indicative of groups of floors of a representative building B and a plurality 28a indicative of the floors of a selective group member such as 26a-1. It will be understood that the operator O could select any of the members of the plurality 26a which would then result in the respective numbers of the plurality 28a being displayed automatically.

For purposes of linking the operator's association with the respective floors, in the illustrated case P3 . . . 2 of the group indicia 26a-1, a background display element 42 linking the member 26a-1 to the members of the plurality 28a can be presented for the operator O. The display 40 illustrates a floor plan 44 for selected parking level P3. It will be understood the operator O can select any of the levels P3 . . . 2 associated with the indicia 26a-1. Selecting different indicia 26a-i will present a different plurality of floor or level related members 28a enabling an operator via a two-step process to then proceed to another floor or level of interest.

Figure 6:
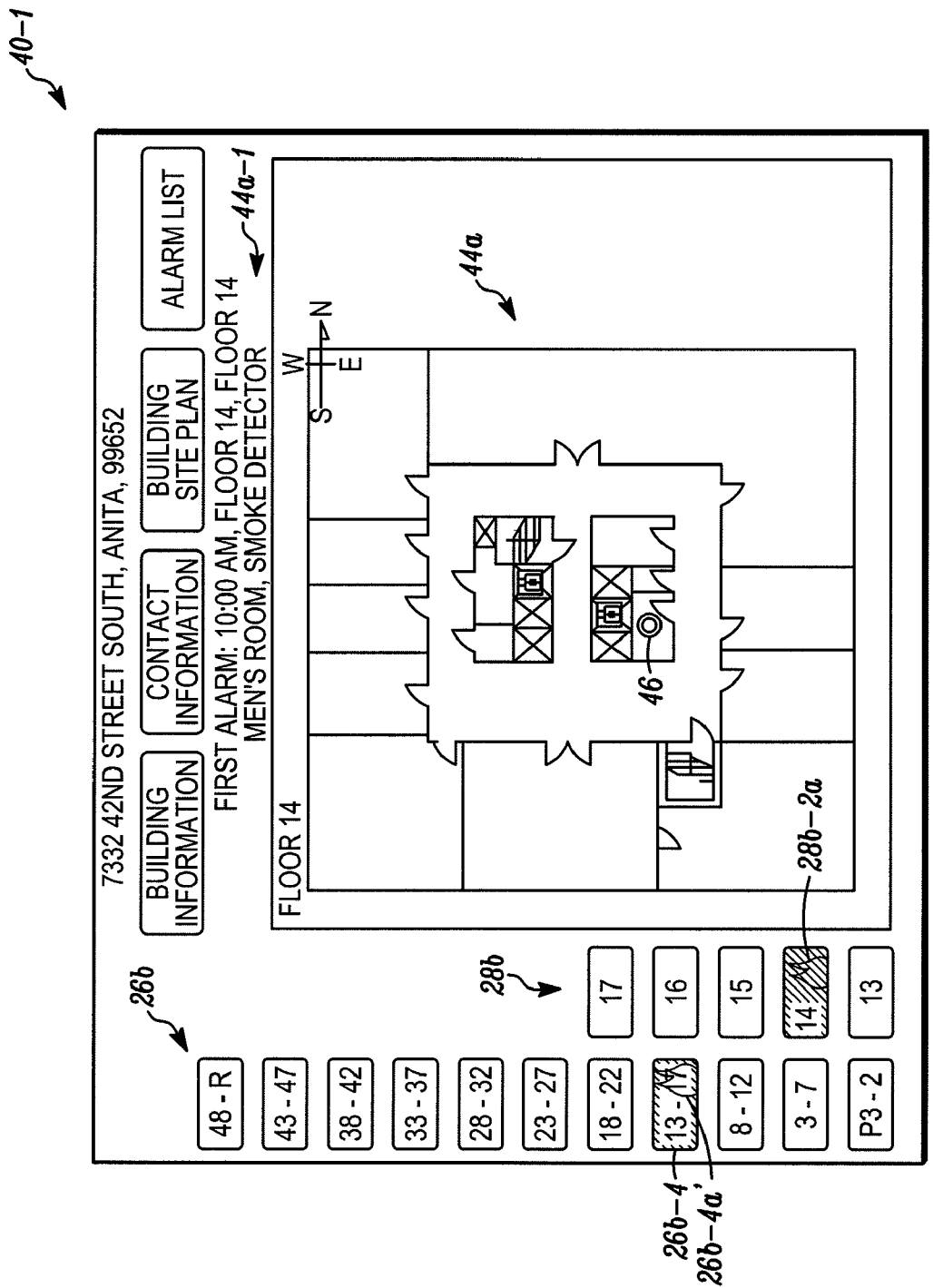
FIG. 6 is a display in accordance with the invention where an initial alarm has been activated.

FIG. 6 illustrates a representative image 40-1 presentable on the display 18a in response to a smoke detector 46 having gone into an active state on the 14th floor or level associated with group 26b-4 which includes floors or levels 13-17. The system 10, in response to an indication from the detector 46, presents a fire indicating indicia such as 26b-4a' in association with the symbol 26b-4. Additionally, the respective respect of plurality of floor or level indicators 28b can be simultaneously displayed with a fire indicating indicia 28b-2a which advises the operator O as to the type of condition and the specific floor on which the condition can be found. Further, image 44a the top plan view can simultaneously be provided. The view 44a can also identify the location of the activated detector 46. Multiple activated detectors could also be displayed along with text message 44a-1.

It will be understood that if more than one floor is reporting an activated detector that respective indicia could be displayed in others of the members of plurality 28b. Multiple text messages could also be provided if desired.

Figure 7:
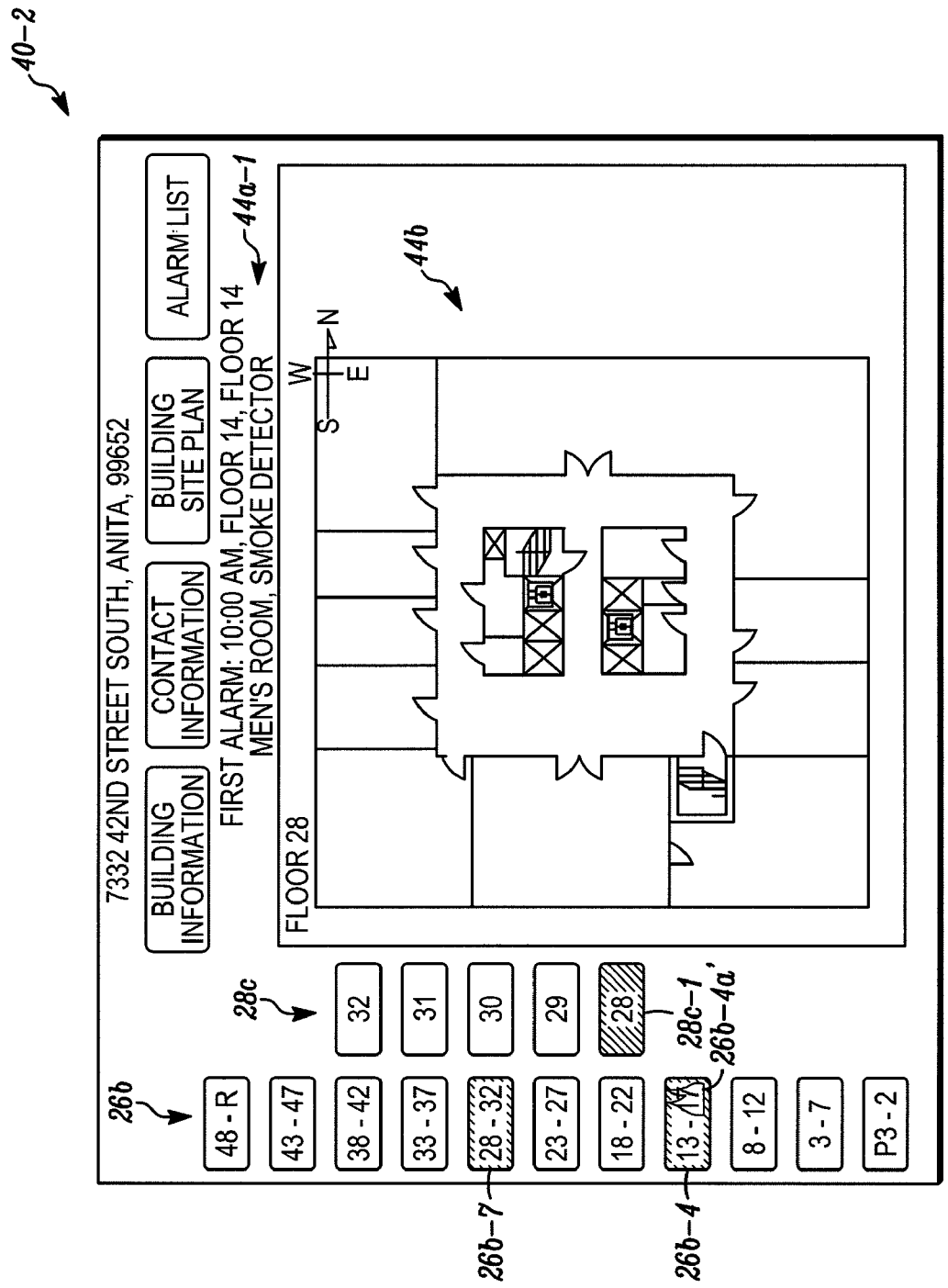
FIG. 7 is an alternate view of the display of FIG. 6.

FIG. 7 illustrates an alternate display 40-2 which can be called up by the operator O by activating element 26b-7 of the plurality 26b. Element 26b-7 in turn presents a secondary display 28c of the various individual floors associated with the group 26b-7. The member 28c-1 can be selected by the operator O manually, or could be displayed automatically, resulting in an image 44b of the floor or level 28.

As illustrated in FIG. 7 none of the detectors on the 28th floor has been activated. However, the indicia 26b-4 and the associated condition indicator 26b-4a' continue to be displayed in the plurality 26b along with the associated visual message 44a-1.

Figure 8:
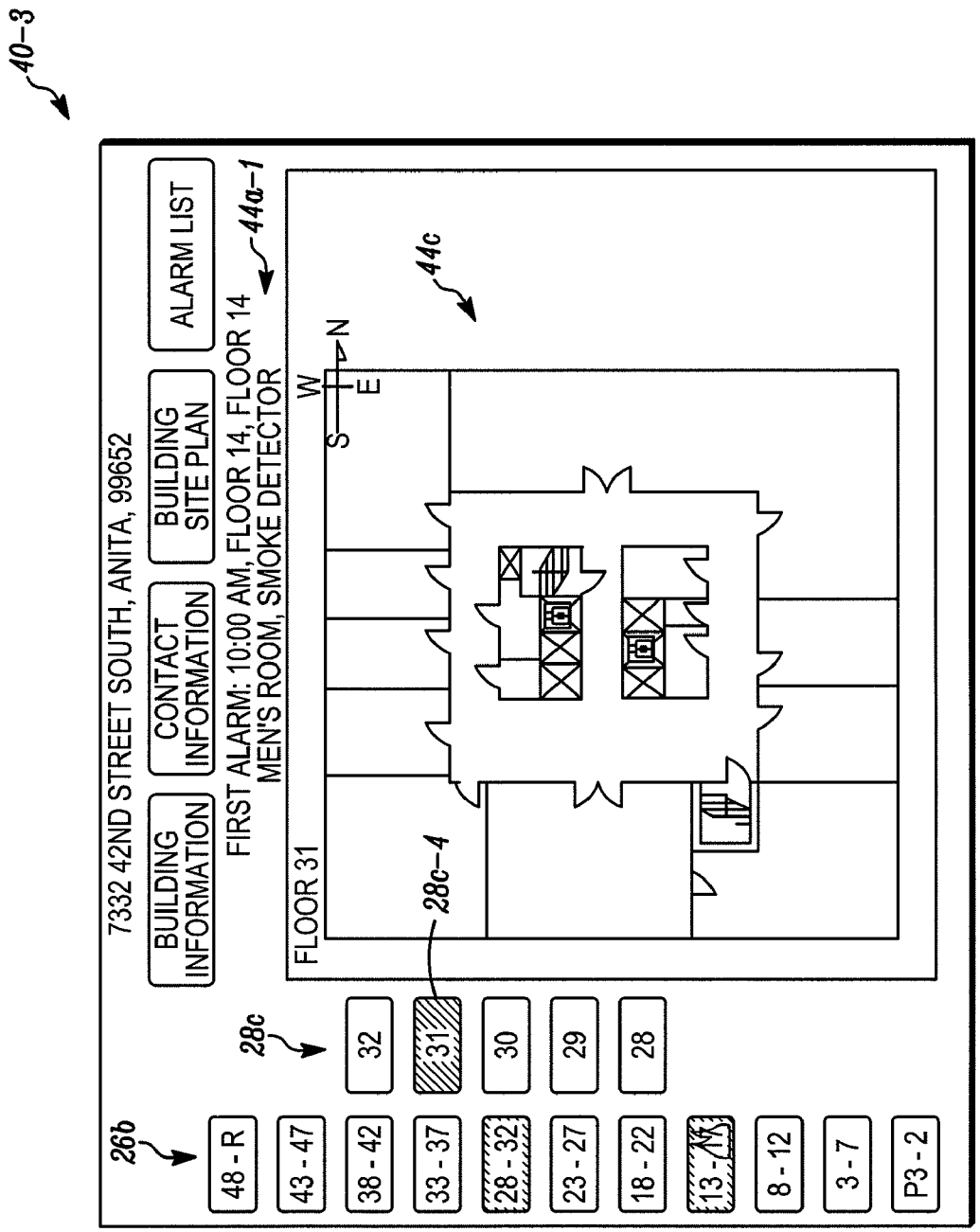
FIG. 8 is yet another alternate view of the display of FIG. 6.

FIG. 8 illustrates an alternate display 40-3 which can be activated or called up by the operator O by selecting element 28c-4 from the plurality of indicia 28c. This in turn presents display 44c, the 31st floor of the building B. As illustrated in FIG. 8 no detectors have exhibited an alarm condition on the 31st floor. However, the alarm indicating message 44a-1 can continue to be displayed for the operator's information.

While the pluralities 26, 28 have been illustrated and described as being presented vertically on the display 18a, it will also be understood that they could also be displayed horizontally without departing from the spirit and scope of the present invention. In this regard, neither the shape nor the types of indicia associated with the members of the pluralities 26, 28 are limitations of the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

In alternate embodiment, a slide bar can be used to identify a level or a floor which is to be displayed. A vertical bar or graph can be presented on a display which is associated with the vertical extent of the building from lowest floor to the top floor.

The slide bar which can also be presented on the same display can be dragged up or down to a floor of interest. Alternately the user can touch or click on "up" or "down" buttons, such as arrows on the display or keys on a keyboard to move one or more floors at a time until the floor of interest has been reached. The "up" or "down" buttons could be located adjacent to one another if desired. As the buttons are clicked, the slide bar moves accordingly. With a touch screen, the operation or user can touch the slide bar to select a floor or level.

An icon, for example a black line or bar, can be used to identify the selected floor. The slide bar can be located directly on, or, beneath the dark or black line to reinforce the information as to which floor has been selected. Additional colors, such as red lines, red floor numbers or icons can be used to alert the user to a floor or floors involved in a condition, such as a fire, intrusion or environmental condition which needs to be investigated.

Figure 9:
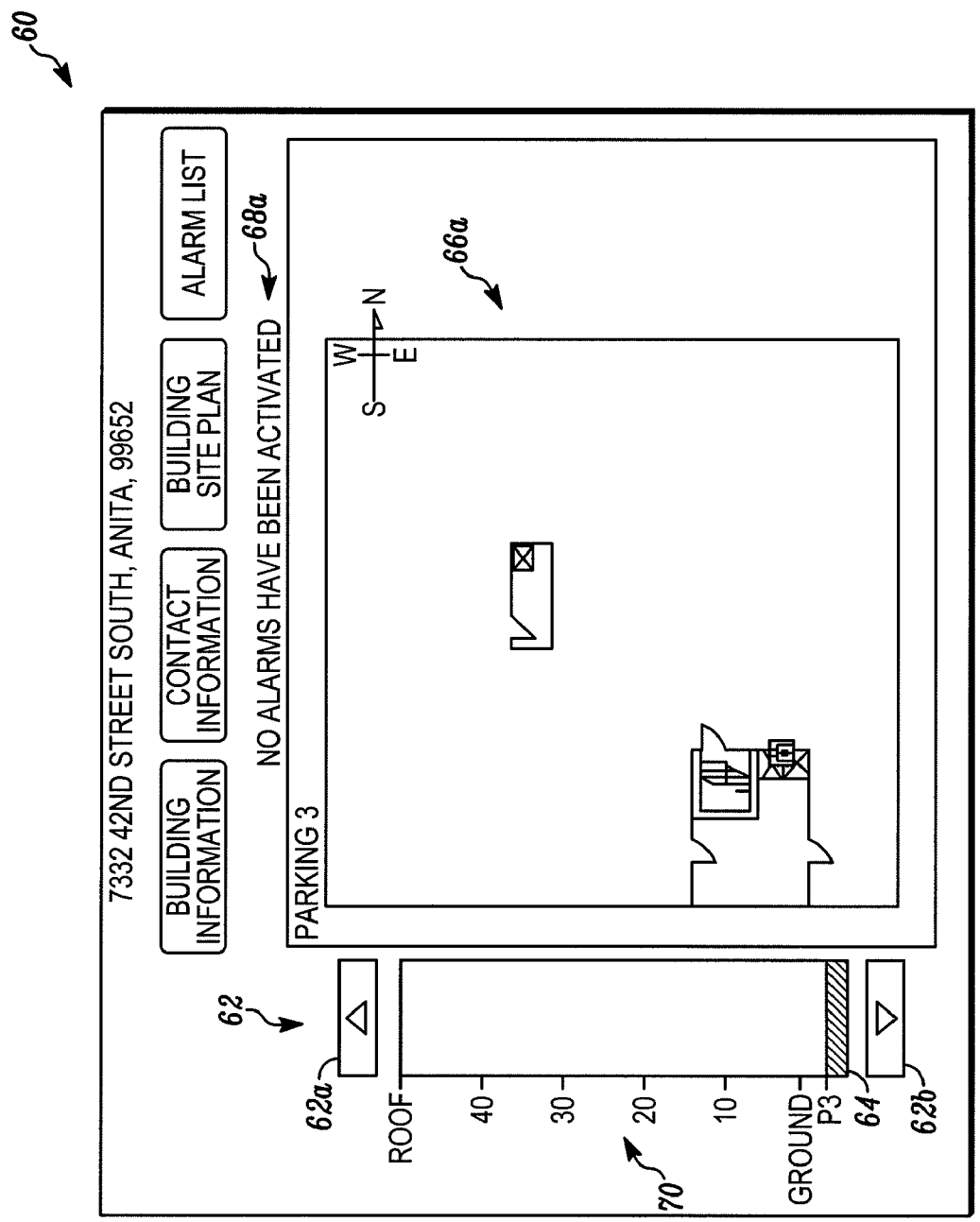
FIG. 9 is a display of an alternate embodiment for specifying a floor of a building in accordance with the invention.

FIG. 9 illustrates a display 60 which incorporates a scroll bar 62 and an associated slide bar 64. The slide bar 64 identifies a floor of the respective building which is currently being displayed. For example, in the exemplary display of FIG. 9, parking level P3, indicated by a heavy black line, is currently being presented as image 66a. As indicated in the message 68a no alarms have been activated.

The slide bar 64 can be manipulated up or down by using a mouse or a track ball as is conventional. The slide bar 64 can also be moved up or down using activatable or clickable light buttons 62a, 62b. The scroll bar 62 can also identify each of the available floors to be displayed, indicated generally at 70.

Figure 10:
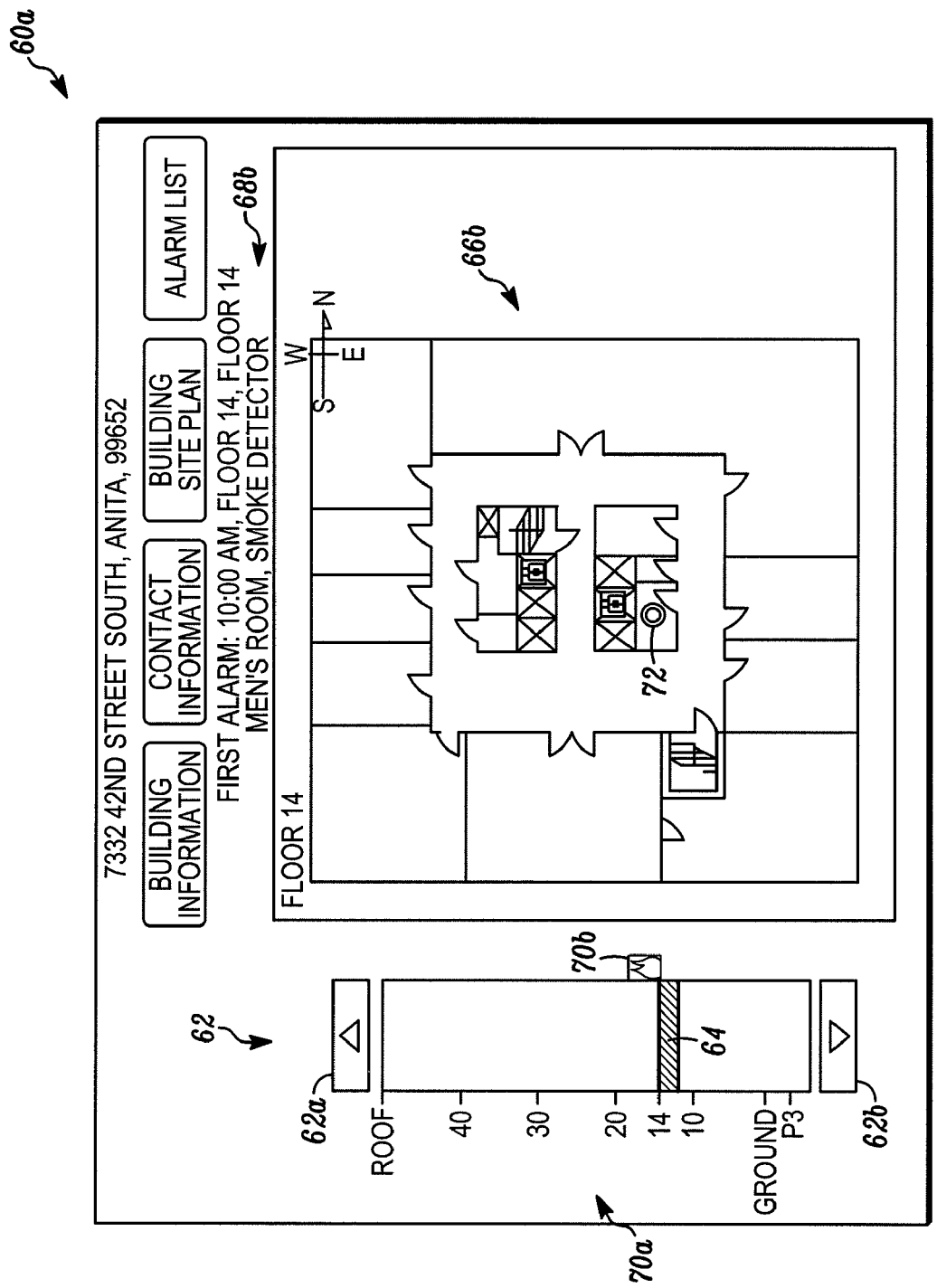
FIG. 10 is a display according to FIG. 9 indicating the presence of an alarm condition on an indicated floor.

FIG. 10 illustrates a display 60a where the scroll bar 62 is presenting information to the operator O as to the presence of an alarm condition, a fire for example, on floor 14 indicated generally at 70a. As illustrated in FIG. 10, the slide bar 64 has been moved so as to specify a floor and is adjacent to a dark elongated bar identifying floor 14 as a floor of interest for exhibiting a potential fire alarm condition.

The presence of a fire alarm condition can be emphasized by the display of a fire indicating icon 70b. Simultaneously, a top plan view 66b of floor 14 can be presented. The image 66b can identify the location of an active fire detector 72 which is indicating the presence of smoke, heat or flame of a type associated with a fire. A text message 68b can also be presented to the operator O simultaneously.

Figure 11:
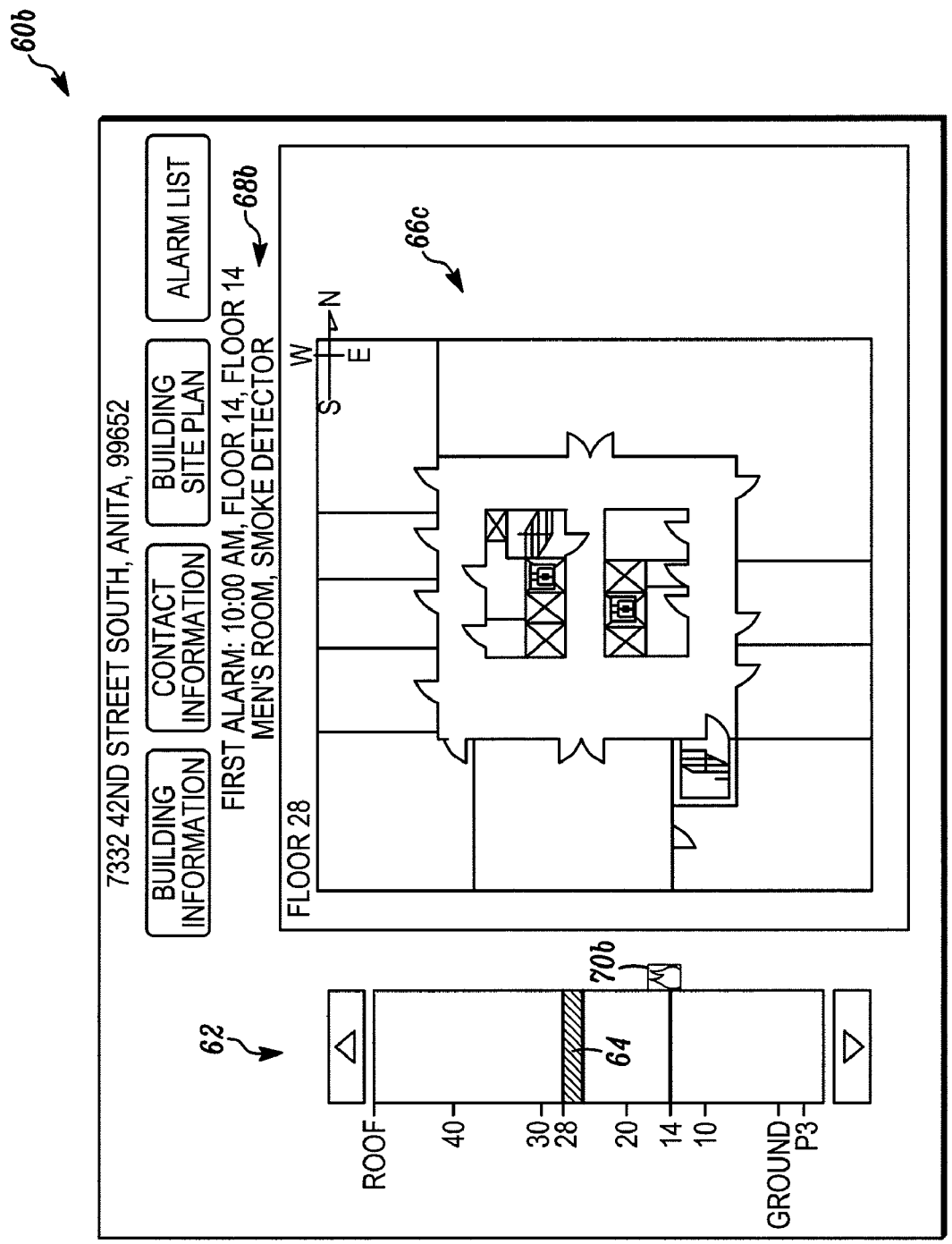
FIG. 11 is a display as in FIG. 9 indicating an alarm condition on a selected floor but presenting a non-alarmed floor.

As illustrated in FIG. 11, in a display 60b an operator can investigate other floors or other conditions by moving the slide bar 64 to a different floor of interest, such as floor 28 which is illustrated in a top of plan view 66c. In the display of 66c, there is no alarm condition present on floor 28. However, the fire indicating icon 70b associated with floor 14 continues to be displayed as does the alarm indicating message 68b associated with floor 14.

Figure 12:
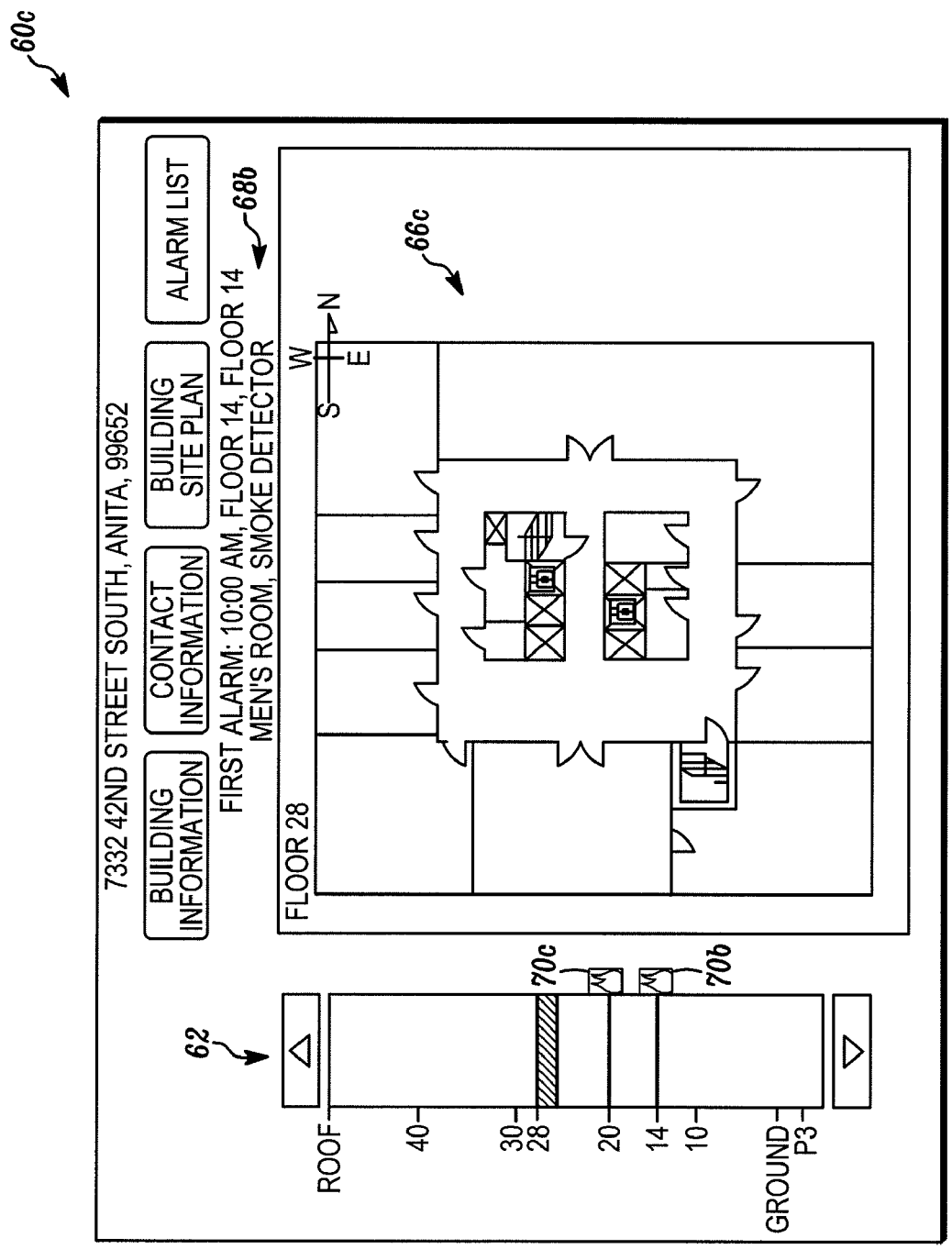
FIG. 12 is a display in accordance with FIG. 9 presenting a non-alarmed floor and indicia indicating two different floors and alarms.

FIG. 12 illustrates in a display 60c an additional fire indicating icon 70c associated with floor 20. The fire indicating icon 70b associated with floor 14 continues to be displayed.

Since the slide bar in display 60c is still located adjacent an indicium for floor 28, a top plan view 66c of floor 28, which is not exhibiting an alarm condition continues to be displayed. The alarm indicating message 68b associated with floor 14 continues to be displayed. It will also be understood that additional text messages could be associated with the message 68b indicating a second alarm associated condition on floor 20.

Figure 13:
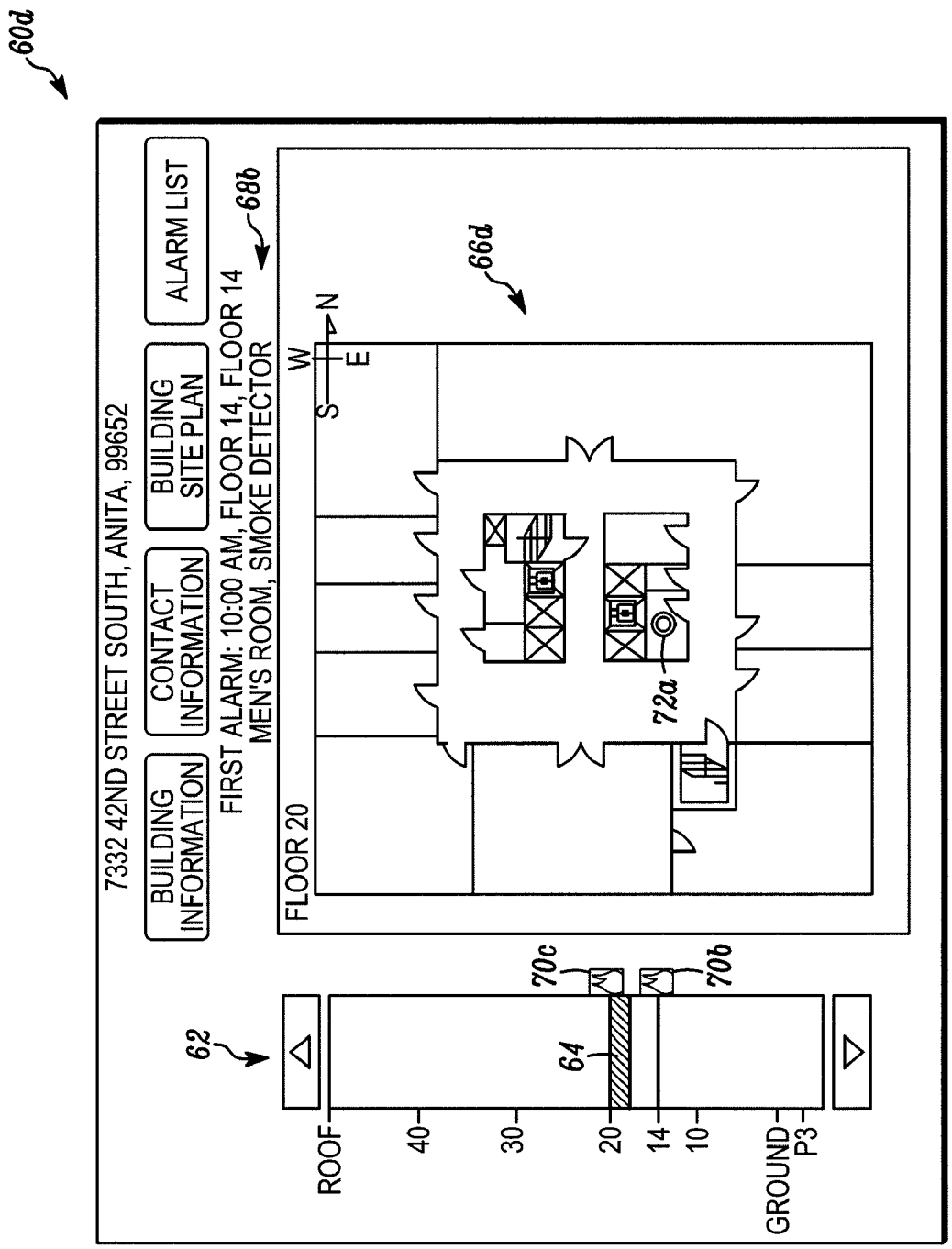
FIG. 13 is a display as in FIG. 9 illustrating another floor which is exhibiting an alarm condition.

In FIG. 13 slide bar 64 has been moved adjacent to an indicium for floor 20, also exhibiting an alarm condition. A top plan view 66d is presented of floor 20. The top plan view 66d illustrates that fire detector 72a on floor 20 has gone into an alarm state. The text message 68b continues to be displayed providing an additional source of information for the operator O.

While the scroll bar 62 has been presented vertically in FIGS. 9-13 it will be understood by those of skill in the art that it could be presented horizontally without departing from the spirit and scope of the present invention. It will also be understood that neither the exact shape of the scroll bar 62 nor the shape or coloring of alarm indicating icons such as 70b,c and limitations of the present invention. Further, the floor selecting indicator could be altered without departing from the spirit and scope of the invention.

In yet another aspect of the invention, an easy to use zoom control supports operators who have minimal computer skills and perhaps no prior training on the respective display. Unlike known zoom controls, the present zoom controls assist the operator in maintaining spatial context. The subject zoom control enables the operator to both maintain overall spatial orientation of the floor or level of the building of interest while magnifying an area of interest on the display of the respective level or floor.

In another aspect of the invention, the window of magnification can be presented on the display at all times. The operator can then simply drag the window from one location to another to look at specific portions of the floor or level of the building of interest in more detail. As a result, the operator never loses orientation relative to the overall building floor plan, which is still presented outside of the magnification window, while at the same time obtaining additional, detailed information from a specific area of interest.

In one embodiment, the zoom control provides only a single level of magnification. It will be understood that multiple levels of magnification could be provided without departing the spirit and scope of the present invention.

Since the window of interest is active only in the area of the floor plan, there is minimal or no conflict with other display functions, menus and/or other displayed buttons.

In a disclosed embodiment, the operator contacts an edge or portion of the window with a cursor, when using a mouse or track ball, or with a finger in the case of a touch screen display. The window can then be dragged to the next desired location on the floor plan. Icons on the floor plan can be magnified proportionate to the magnification of the floor itself within the window. Thus, both the icons and the floor features can scale together and maintain their spatial relationship while being magnified. Alternately, the icons could retain their unmagnified size while the surrounding location is enlarged.

Figure 14A:
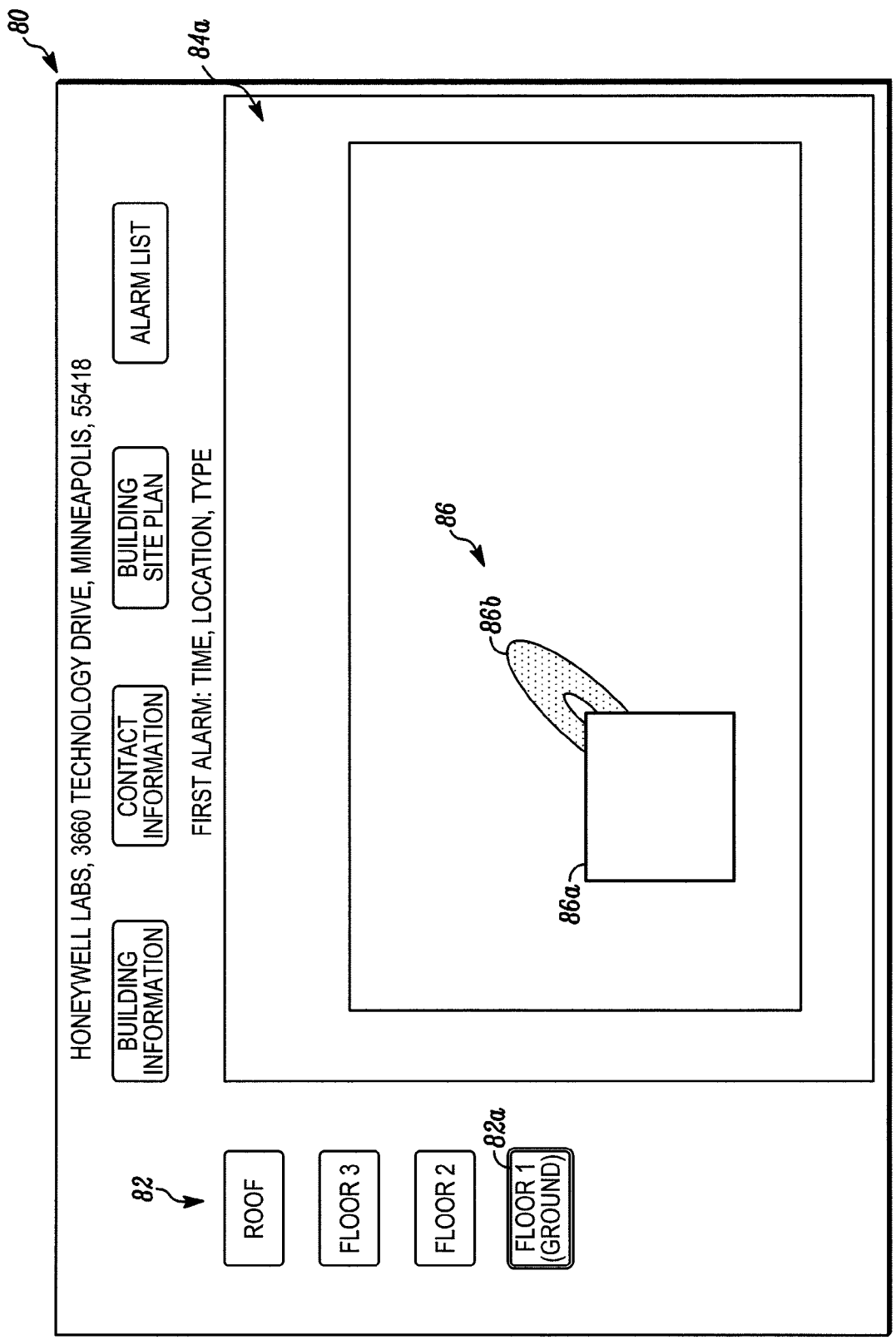
FIG. 14A illustrates an exemplary display of inactive floor plan having an enlargement window.

FIG. 14A illustrates an image 80 relative to a 3 floor building being monitored. The image 80 incorporates floor or level selecting buttons or slide bars of the type described previously. For illustrative purposes, floor 1, identified by activated button 82a has been selected for display.

In FIG. 14A, the various detectors, alarm indicators or condition indicators associated with the respective building are all inactive. As a result, an image 84a is displayed of the first floor without any details thereof indicating that the monitored condition of the building is inactive.

The inactive floor indicating image 84a displays a draggable zoom window indicated generally at 86. The window 86 includes a bounding periphery 86a which identifies the region of the floor being displayed which is being enlarged. An optional handle 86b is displayed in FIG. 14A for purposes of moving the window 86. It will be understood that the handle 86b is optional and could have a variety of shapes The window can be moved alternately by merely placing a cursor on the bounding image 86a and moving same.

Figure 14B:
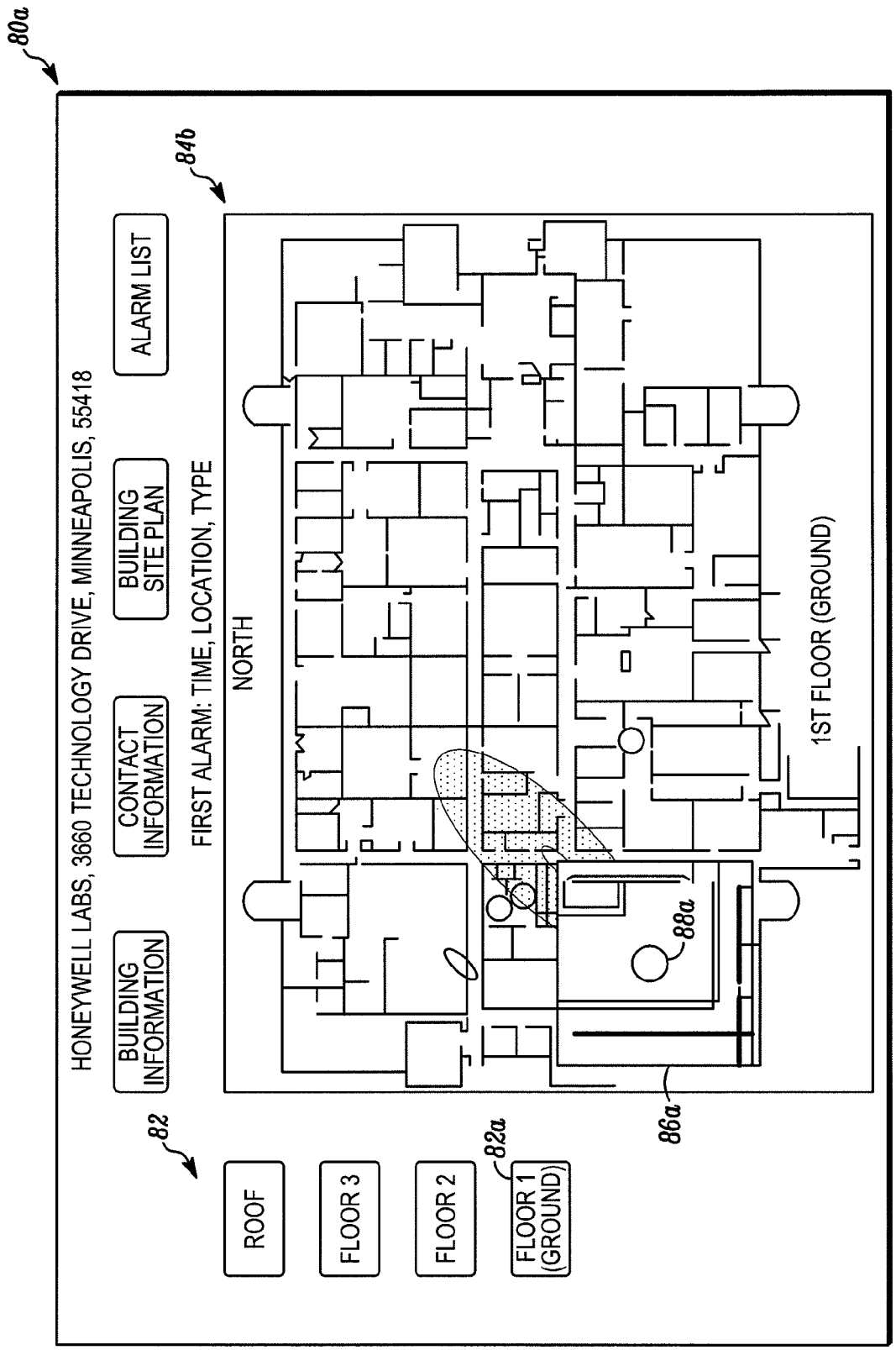
FIG. 14B illustrates the floor plan of FIG. 14A where a detector has become active and has automatically been enlarged by an enlargement window.

FIG. 14B illustrates a display 80a, again of the first floor of the respective building. The floor plan image 84b of FIG. 14B can be automatically presented by the system 10 in response to sensing an activated detector, such as detector 88a. Simultaneously, the bounding zoom window 86a can be automatically located such that the portion of the first floor displayed by image 84b includes detector 88a and is enlarged for the operator. Other areas of the display of the image 84b, the top plan of the first floor, are not enlarged as they are outside of the bounding window 86a.

Figure 15:
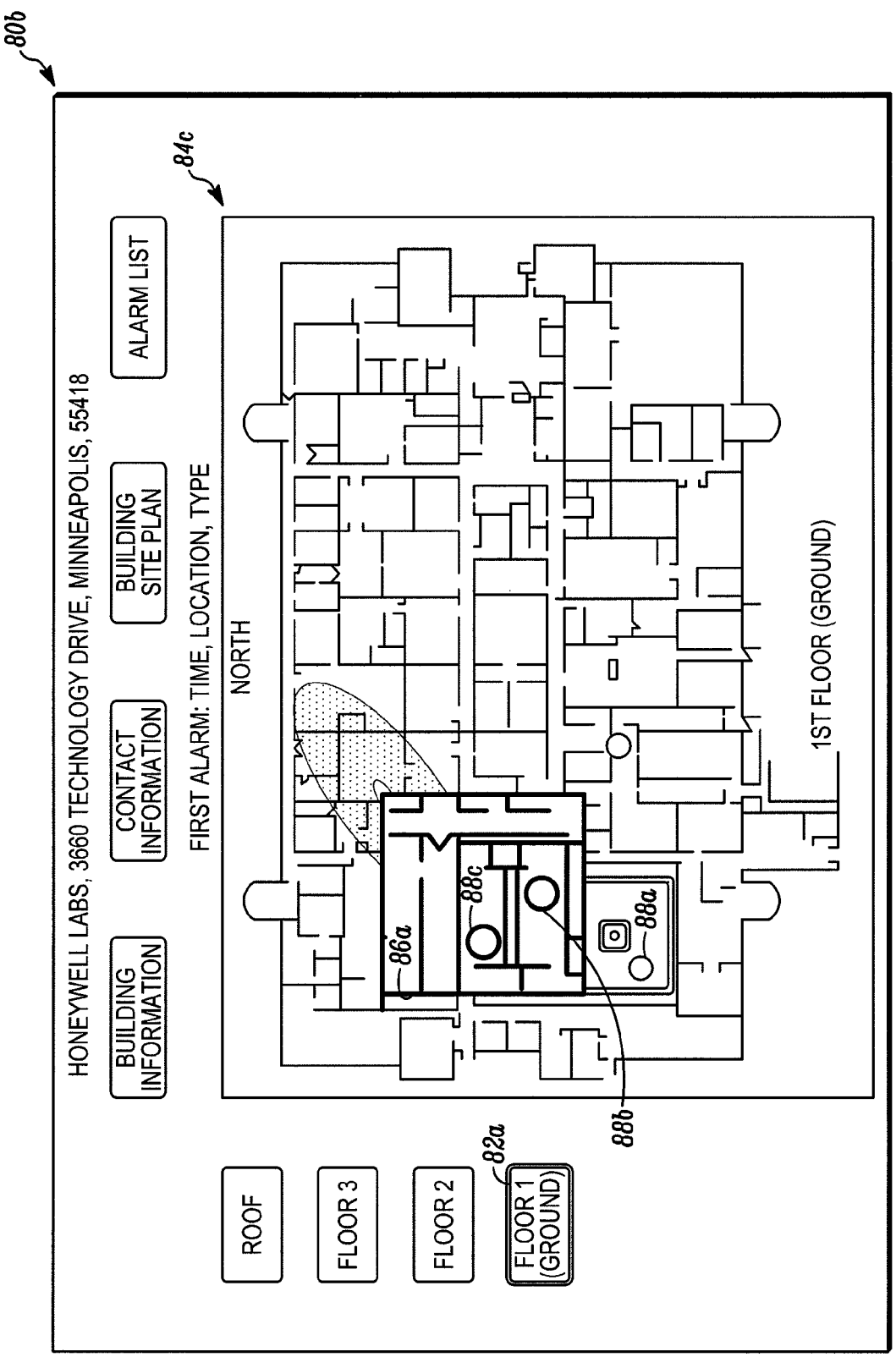
FIG. 15 illustrates a floor plan as in FIG. 14B with the movable zoom window encompassing other active detectors on the respective floor.

FIG. 15 illustrates the bounding window 86a having been moved off of the detector 88a so as to encompass activated detectors 88b,c. In the exemplary image 84c of FIG. 15, the detector 88a has returned to its normal size, relative to the rest of the floor plan for the first floor and the two detectors 88b, 88c within the bounding window 88a are enlarged along with other structural members of that portion of the first floor.

Figure 16:
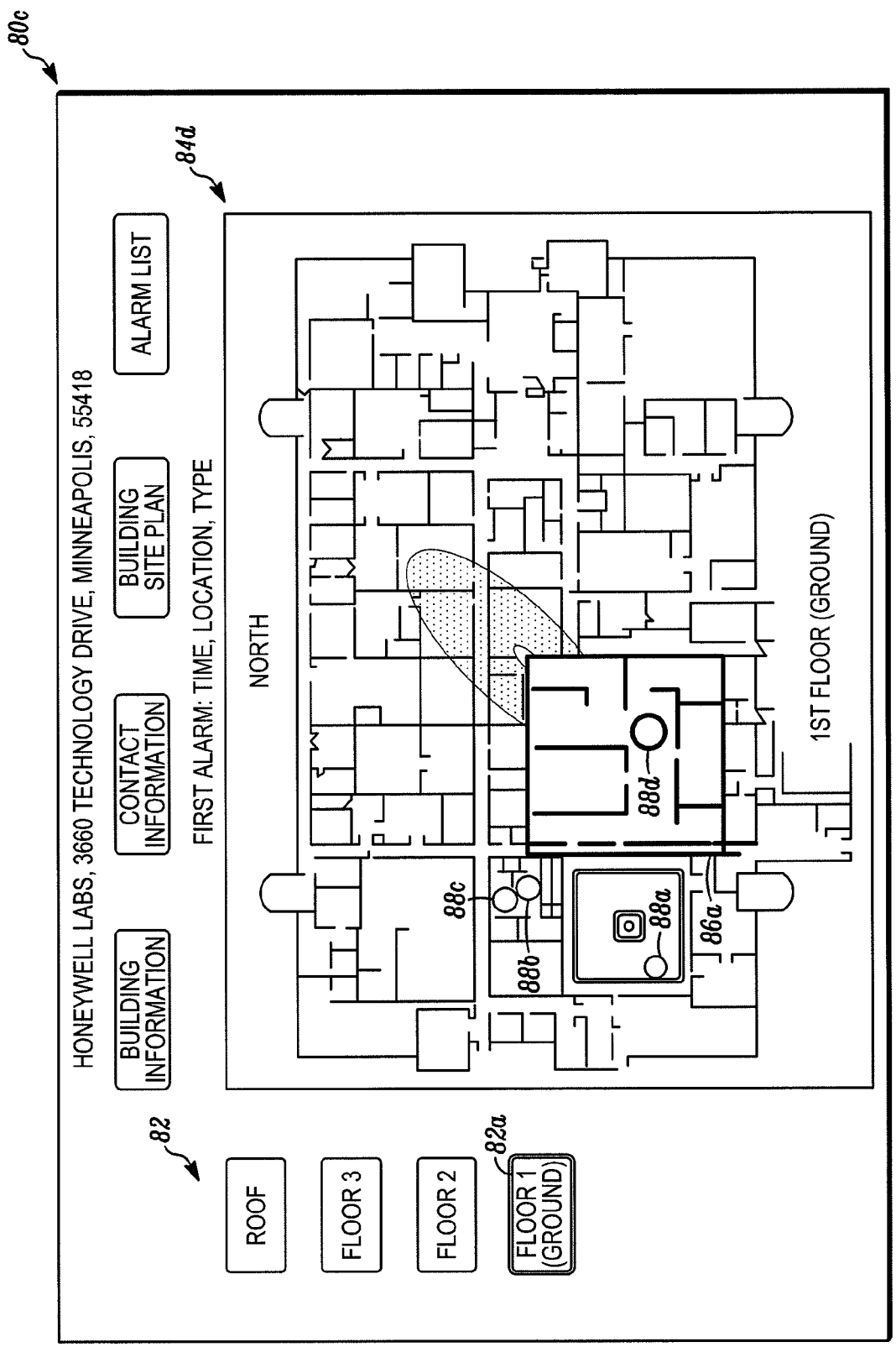
FIG. 16 illustrates the floor plan of FIG. 14B with the movable zoom window enlarging yet another activated detector on the floor.

FIG. 16 illustrates the bounding window 86a having been moved such that it encompasses yet another activated detector 88d. In the image 84d of the first floor, activated detectors 88a, 88b and 88c all are exhibited in their normal enlarged state. Only the activated detector 88d is illustrated, within the bounding window 86a as being enlarged.

Figure 17:
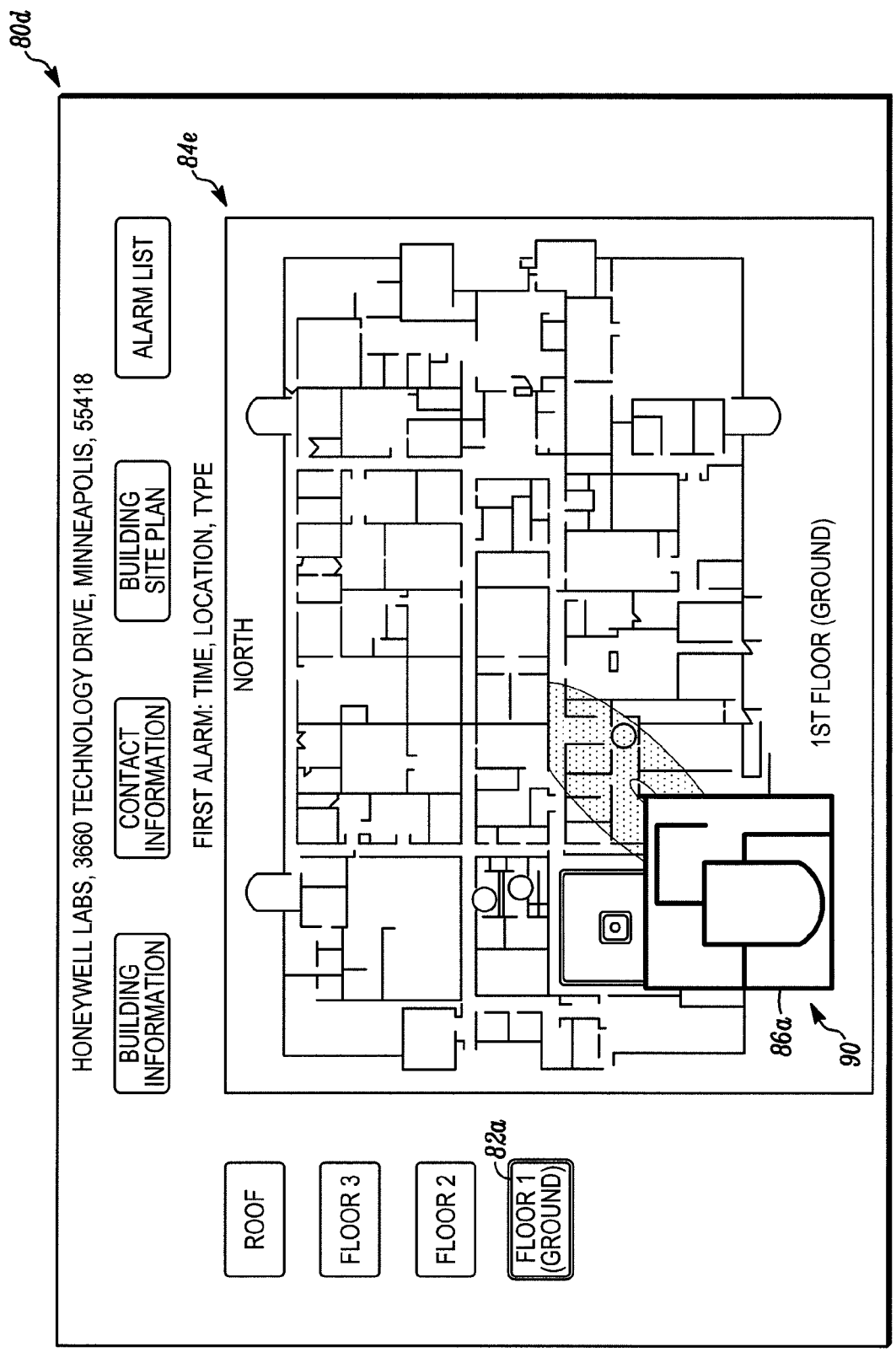
FIG. 17 illustrates the floor of FIG. 14B with a portion of a stairwell enlarged by the movable zoom window.

FIG. 17 presents display 80d, also a top plan view of the first floor of the respective building. In the exemplary image 84e of the FIG. 17, the bounding zoom window 86a has been positioned to encompass a stairwell indicated generally at 90. Since the stairwell 90 is within the bounding window 86a it has been illustrated as enlarged.

Thus, software 16b can provide a variety of enlarged images selected by the operator by dragging the respective zoom window outline 86a to the appropriate location of the floor being displayed.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. Apparatus comprising:
a processor;
a display coupled to the processor;
a plurality of mother buttons simultaneously depicted in a column on the display where each mother button represents a geographical area of a facility;
first software within the processor that monitors activation of the plurality of mother buttons and that displays one or more daughter buttons on the display directly adjacent the column of mother buttons upon activation of any of the mother buttons where each of the daughter buttons represent a portion of the geographic area of the respective mother button;
second software within the processor that monitors each of the displayed daughter buttons and that simultaneously depicts a physical layout of the portion of the geographic layout represented by the daughter button in a location of the display separate from the daughter button when ever the daughter button is activated where the physical layout includes a plan view of a floor plan of at least one building; an activated fire sensor, security sensor, and environmental sensor displayed in conjunction with at least one mother button associated with the activated sensors of the plurality of mother buttons and also displayed in conjunction with at least one daughter button associated with the activated sensors of the one or more daughter buttons, wherein the activated sensors are displayed in conjunction with the mother and daughter button in the absence of activation of the mother or daughter button and in the absence of the physical layout of the mother or daughter button and wherein the displayed sensors provide a guide to locating and displaying a physical layout with activated sensors; and enlargement software to provide a zoom function for a portion associated with an activated sensor, where the enlargement software provides a closed displayable member which defines a region being enlarged, and the closed displayable member being movable thereby altering the region being enlarged.

2. The apparatus as in claim 1 further comprising one or more environmental sensors disposed within each of the portions of the geographic area.

3. The apparatus as in claim 1 further comprising displaying an alarm indicating icon beside a corresponding mother and daughter button when ever the one or more environmental sensors of the area associated with the mother and portion associated with the daughter button are activated.

4. An apparatus comprising:
software disposed within a processor for presenting on a display first and second pluralities of indicia and activated sensors associated with the first and second pluralities of indicia, the members of the first plurality are presented in a column simultaneously and each specify a group of entity characteristics, the members of the second plurality displayed directly adjacent the column of first pluralities of indicia each specify a physical layout of a member of the group specified by a respective member of the first plurality wherein the physical layout is presented on the display in a location that is separate from the first and second pluralities of indicia and wherein the second pluralities are selectively displayed in response to selection of a corresponding one of the simultaneously presented members of the first plurality and wherein an activated fire sensor, an activated security sensor, and an activated environmental sensor are displayed simultaneously in conjunction with at least one respective member associated with the activated sensors of the first plurality and also displayed in conjunction with at least one member associated with the activated sensors of the second plurality or where each of the members of the first plurality and displayed members of the second plurality having an associated activated sensor is colorized as a guide for locating and displaying a physical location of activated sensors on a corresponding physical layout of the member of the second plurality, wherein the activated sensor is displayed in conjunction with the associated member or the associated member is colorized, the activated sensor or colorized member is displayed in the absence of selection of the members and in the absence of the physical layout specified by the members, and wherein the apparatus includes a window for providing an enlargement of a portion associated with an activated sensor, wherein the window defines the portion being enlarged, and the window being movable thereby altering the portion being enlarged.

5. An apparatus as in claim 4 where the first plurality comprises groups of levels of a building.

6. An apparatus as in claim 5 where the second plurality comprises the individual levels of a respective group of levels of the first plurality.

7. An apparatus as in claim 4 which includes second software to select a member of the first plurality and a member of the second plurality.

8. An apparatus as in claim 7 where the second software responds to at least one of a manual input, or an output from a transducer.

9. An apparatus as in claim 8 where the entity characteristics of the first plurality comprise groups of floors in a structure being monitored.

10. An apparatus as in claim 9 where the members of the second plurality comprise individual floors of a selected group of floors.

11. An apparatus as in claim 4, which includes a display upon which members of the first and second pluralities can be presented.

12. An apparatus, as in claim 11 which includes second software, to manually select a member of each plurality.

13. An apparatus as in claim 12 which includes additional software responsive to a plurality of indicium from condition detectors, to select a member of each plurality.

14. An apparatus as in claim 13 which includes further software to present a condition indicating indicium at least with a respective member of the first plurality.

15. An apparatus as in claim 14 where the further software also presents a condition indicating indicium with a respective member of the second plurality.

16. An apparatus as in claim 15 which includes a plurality of ambient condition detectors and control circuitry coupled thereto for implementing the software.

17. An apparatus as in claim 16 which includes added software that evaluates indicia received from the detectors.

18. An apparatus comprising:
software disposed within a processor for presenting on a display one of a manually manipulatable, movable member for specifying a member of first and second pluralities of indicia and activated sensors associated with each of the first and second pluralities, the members of the first plurality are presented in a column simultaneously and each specify a group of entity characteristics, the members of the second plurality displayed directly adjacent the column of first pluralities of indicia each specify a physical layout of a member of the group specified by a respective member of the first plurality wherein the physical layout is presented on the display in a location that is separate from the members of the first and second pluralities of indicia and wherein the second pluralities are selectively displayed in response to specifying the respective members of the first plurality and wherein an activated fire sensor, an activated security sensor, and an activated environmental sensor are displayed simultaneously adjacent at least one respective member associated with the activated sensors of the first plurality of indicia and also simultaneously displayed adjacent at least one member associated with the activated sensors of the second plurality as a guide for locating and displaying the activated sensors on the corresponding physical layout of the members of the second plurality, wherein the activated sensor is displayed in conjunction with the associated member or the associated member is colorized in the absence of selection of the members and in the absence of the physical layout specified by the members, and wherein the apparatus includes enlargement software to provide a zoom function for a portion associated with an activated sensor, wherein the enlargement software provides a closed displayable member which defines a region being enlarged, and the closed displayable member is movable thereby altering the region being enlarged.

19. An apparatus as in claim 18 where the first plurality comprises groups of levels of a building.

20. An apparatus as in claim 19 where the second plurality comprises the individual levels of a respective group of levels of the first plurality.

21. An apparatus as in claim 18 where members of the group comprise floors of a building being monitored.

22. An apparatus as in claim 18 which includes a displayable window for providing an enlargement of a portion of a region within the window.

23. An apparatus as in claim 18 where the movable member is presented by the software in the foim of a movable slide bar.

24. An apparatus as in claim 23 where the software presents the slide bar adjacent to an indicium that is being selected.

\* \* \* \* \*